Feb. 1, 1944.  C. A. GOSLING  2,340,466
PISTON AND LIKE PACKING DEVICES
Filed Aug. 20, 1940

CLIVE AUSTIN GOSLING
INVENTOR
M. W. McConkey
ATTORNEY

Patented Feb. 1, 1944

2,340,466

UNITED STATES PATENT OFFICE 2,340,466

PISTON AND LIKE PACKING DEVICE

Clive Austin Gosling, London, England, assignor to Automotive Products Company Limited, London, England Application August 20, 1940, Serial No. 353,409
In Great Britain September 1, 1939

4 Claims. (Cl. 309—33)

This invention relates to piston and like packing devices, and it has for its primary object to provide an exceptionally simple form of seal which is capable of resisting leakage of fluid in either direction. The invention is intended more particularly for the packing ring which is employed at the tail end of the piston of hydraulic master cylinder units where the piston is reduced in diameter intermediate its length so as to form an annular chamber connected with the usual reservoir of the system.

According to the present invention, a piston or like packing device comprises a single ring formed from rubber or like mouldable elastic material, and provided with a pair of lips which, when the packing device is in position, are directed axially in opposite directions to prevent leakage of fluid across the packing from either side.

The packing may comprise a ring of substantially U-shaped cross-section, one limb of which forms the main body of the packing, whilst the other limb forms one lip.

According to a further feature of the invention, there is provided in a master cylinder unit of a hydraulic braking system, a piston packing comprising a ring which is moulded from rubber or equivalent elastic material and is formed with two lips which, when the packing is in position are directed, one forwardly to prevent leakage of liquid from the reservoir, and one rearwardly to prevent air from being drawn into the system during the retracting movement of the piston.

The rearwardly directed lip of the packing may be of generally rounded section; the forwardly directed lip may project obliquely outwardly from the substantially rectangular ring forming the main body of the packing, and be undercut at its junction therewith, the rearwardly directed lip comprising a substantially rounded rib formed on the outer rear corner of the rectangular ring by cicumferential grooving of the outer and rear faces of the ring.

The invention is hereinafter described with reference to the accompanying drawing, in which.

Figure 1:
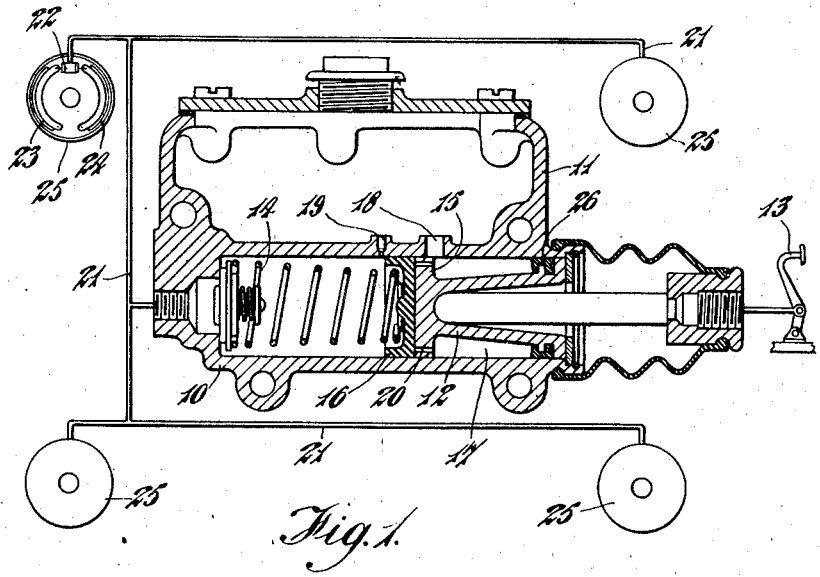
Figure 1 illustrates diagrammatically a hydraulic braking system having a master cylinder to which the invention is applied.

Referring to Figure 1, the braking system comprises a master cylinder 10 having a reservoir 11 cast integral therewith, a piston 12 being movable forwardly in the cylinder by means of a pedal 13, and being returned by a spring 14. On the piston head 15 is a cup packing 16 making a fluid-tight joint with the cylinder so that as the piston is moved forward by the pedal, liquid pressure is created in the cylinder. The piston 12 is reduced in diameter behind its head to form an annular chamber 17 connected by a port 18 with the reservoir 11, so that the chamber 17 is constantly filled with liquid. A second port 19 of small diameter connects the reservoir and the cylinder, being just forward of the cup packing 16 when the piston is fully retracted. The cylinder 10 is connected by piping 21 to motor cylinders 22 (only one of which is shown) acting to spread apart brake shoes 23, 24 acting on drums in each of the four wheels 25 of the vehicle to which the braking system is fitted.

Forward movement of the piston 12 due to pressure on the pedal 13 causes the cup packing 16 to pass over the port 19, and then to force liquid from the master cylinder through the pipelines 21 to the motor cylinders 22, thus applying the brake shoes to the drums, and the pressure exerted on the pedal is transmitted through the liquid to the shoes. When the pedal is released, the piston 12 is returned by the spring 14 towards its retracted position, thus allowing the liquid previously forced into the pipelines 21 to return into the master cylinder under the pressure exerted on the motor cylinder pistons by the brake shoe pull-off springs. Owing to the restricted cross-section of the pipe-lines, the piston 12 may return so rapidly that liquid from the pipelines does not return to the cylinder quickly enough to follow up its movement and maintain the cylinder full. In that event the cup 16 collapses and permits liquid from the chamber 17 to enter the cylinder through ports 20 in the piston head, thus keeping the cylinder full of liquid. Surplus liquid thus drawn into the cylinder returns to the reservoir 11 through the port 19, when the piston reaches its retracted position, being displaced by that returning from the pipelines.

Figure 2:
Figure 2 is a cross section of one form of piston packing according to the invention.
Figure 3:
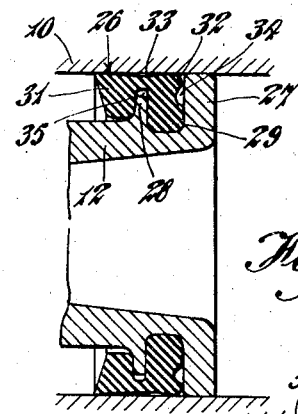
Figure 3 is a fragmentary view of a master cylinder piston with a packing according to the invention in position thereon.

To retain liquid in the chamber 17, and to prevent the entry of air thereinto, a packing 26 is provided at the rear or tail end of the piston. The piston 12 has at its extreme rear end a flange 27 which is a working fit in the cylinder 10, and spaced from this flange so as to form an annular groove is a circumferential rib 28 of somewhat less diameter than the flange. The packing 26, which is shown on a larger scale in Figures 2 and 3 is substantially U-shaped in cross-section, one limb 29 of the U forming the main body of the packing, and being accommodated between the flange 27 and rib 28 on the piston, whilst the other limb is formed by an undercut lip 31 facing towards the head of the piston, and serving to prevent the passage of liquid outwardly towards the rear end of the cylinder. A second lip 32 is formed on the outer rear corner of the body 29 of the packing, by grooving the outer and rear surfaces of the ring at 33 and 34, respectively, the lip 32 being of rounded shape. Figure 2 shows the packing 26 in its initial form before mounting on the piston, and it will be seen that the lip 32 projects outwardly at an angle of about 45° to the axis of the packing, whilst the lip 31, which is of trapezoidal form projects substantially axially, but has its inner and outer surfaces lying at an angle of about 20° to the axis. In Figure 3 the packing 26 is shown mounted on the piston, and inserted in the cylinder 10. The main body 29 of the packing fits closely between the flange 27 and the rib 28, the base of the groove between these parts being slightly greater in diameter than the interior of the part 29 of the packing, so that the latter engages firmly with the base of the groove and tends to expand axially to engage firmly both the walls of the groove. The insertion of the piston in the cylinder distorts both lips somewhat inwardly, the lip 31 tending to bend about its junction with the main body 29 of the packing, so that the outer inclined surface of the lip approaches an axial position and lies along the wall of the cylinder, whilst the radially inner part of the lip is turned inwardly and rearwardly to bear on the forward face of the rib 28. The lip 31 thus presents to the chamber 17 an inclined surface sloping rearwardly from the cylinder wall to provide an acute angle at its junction with the outer face of the packing, and liquid pressure in the cylinder acts on this sloping surface to urge the packing against the cylinder wall. The undercutting of the lip 31 is deep enough to provide a clearance space 35 around the periphery of the rib 28, and there is also clearance between the inner wall of the lip 31 and the adjacent wall of the piston. It will be seen that, owing to their distortion on assembly, both lips 31 and 32 engage the cylinder wall with some degree of initial interference, and thus are able to prevent leakage when the pressures acting are very low.

Figure 4:
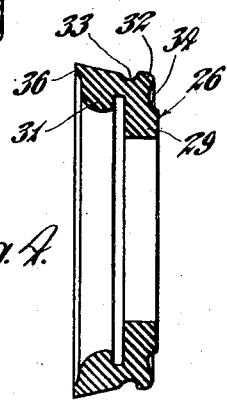
Figures 4 and 5 are views corresponding to Figures 2 and 3, but showing a modified form of the invention.
Figure 5:
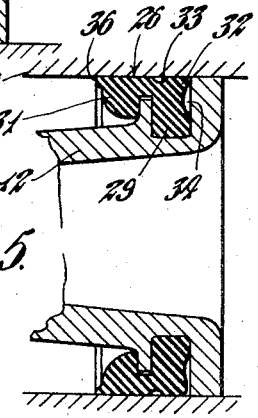

Figures 4 and 5 show a form of packing slightly different from that shown in Figures 2 and 3, though having the same general characteristics. The lip 31 is formed with an additional relatively small axially directed lip 36 providing a thin forward edge to the main lip, and the forward face of the lip 32 is substantially perpendicular to the axis of the packing, thus providing a greater area of that lip to contact with the cylinder wall. The peripheral surface of the lip 31 is formed to a conicity of less angle than in the form of packing shown in Figures 2 and 3, and does not merge smoothly into the groove 33. This lip also has a greater area of contact with the cylinder wall than does the lip 31 in Figures 2 and 3.

It will be appreciated that various modifications can be made in the shape and construction of the improved packing. For instance, although in the examples illustrated the rear limb of the U, forming the main body of the packing, and the lip 32 are completely accommodated between the flange 27 and rib 28, it is possible to cut away the flange 27 so as to enable the lip 32 to be increased in size. Further, the improved packing is applicable to pistons generally, and if desired the central part of the packing ring can be in the form of a single bead adapted to fit into a single corresponding groove formed in the piston, two lips being provided and being directed to act in opposite senses.

It is well-known that a packing ring of the type described in this specification, when moving relatively to the cylinder barrel is subject to considerable frictional resistance, and that, generally speaking, the more effective the seal provided, the greater the friction, particularly when the packing is moving towards the direction from which the pressure to be sealed is acting. In a hydraulic master cylinder unit, the piston is usually returned by a spring such as the spring 14 in Figure 1, and in order that the piston may return sufficiently quickly after an application of the brakes to be ready for a second application in a short time, the frictional resistance to the return movement of the piston must be kept low. For this reason, it has not been customary to provide a rearwardly projecting lip on the packings hitherto used in the place of the packing 26, Figure 1, the small pressure difference across the packing being relied upon to prevent the entry of air into the cylinder. It has been found, however, that such packings are not entirely satisfactory, as air tends to leak to some extent into the cylinder, and the packing of the present invention has been designed with the object of providing a rearwardly facing lip which, whilst presenting a sufficient degree of resistance to the entry of air, does not increase the frictional resistance to movement of the piston sufficiently to affect seriously the time required by the piston to return to its retracted position under the influence of its return spring.

What I claim is:

1. For use with a piston and cylinder unit, a packing device mounted on and moving with the piston comprising a single ring of substantially U-shaped cross-section formed from moldable elastic material and provided with a pair of lips which contact the cylinder wall and which are directed axially in opposite directions to prevent leakage of fluid across the packing from either side, one limb of the U constituting the main body of the packing while the other limb forms one of the aforesaid lips, and the second lip comprising an inclined circumferential rib on the main body of the packing.

2. The combination of a piston having a circumferential groove therein one side of which is formed by a circumferential rib projecting from the piston, with a packing device mounted on and moving with the piston comprising a single ring of substantially U-shaped cross-section formed from moldable elastic material and provided with a pair of lips which contact the cylinder wall and which are directed axially in opposite directions to prevent leakage of fluid across the packing from either side, one limb of the U constituting the main body of the packing and extending into the circumferential groove on the piston while the other limb forms one of the aforesaid lips, and the second lip comprising an inclined circumferential rib on the main body of the packing.

3. In a master cylinder unit of a hydraulic braking system, a piston packing comprising a ring which is molded from rubber or equivalent elastic material, said packing ring having a substantially rectangular cross-section portion forming the main body thereof and having two lips which, when the packing is in position, are directed, one forwardly to prevent leakage of liquid from the reservoir, and one rearwardly to prevent air from being drawn into the system during the retracting movement of the piston, said forwardly directed lip projecting obliquely outwardly from the substantially rectangular cross-section portion which forms the main body of the packing ring and being undercut at its junction therewith, said rearwardly directed lip comprising a substantially rounded rib formed on the outer rear corner of the substantially rectangular cross-section portion by circumferential grooving of the outer and rear faces of the ring.

4. In a master cylinder unit of a hydraulic braking system, a piston packing comprising a ring which is molded from rubber or equivalent elastic material, said packing ring having a substantially rectangular cross-section portion forming the main body thereof and having two lips which, when the packing is in position, are directed, one forwardly to prevent leakage of liquid from the reservoir, and one rearwardly to prevent air from being drawn into the system during the retracting movement of the piston, said forwardly directed lip being of substantially trapezoidal shape in cross-section and projecting obliquely outwardly from the substantially rectangular cross-section portion which forms the main body of the packing ring, and being undercut at its junction therewith, said rearwardly directed lip comprising a substantially rounded rib formed on the outer rear corner of the substantially rectangular cross-section portion by circumferential grooving of the outer and rear faces of the ring.

CLIVE AUSTIN GOSLING.